Patented Oct. 6, 1931

1,826,124

UNITED STATES PATENT OFFICE

LYMAN S. BUSHNELL AND RITA MORALES, OF FREEPORT, TEXAS; ASSIGNORS TO FREEPORT SULPHUR COMPANY, A CORPORATION OF TEXAS

METHOD OF REMOVING CARBONACEOUS MATTER FROM SULPHUR AND IMPROVING ITS COLOR

No Drawing.    Application filed July 31, 1928.    Serial No. 296,625.

Our invention relates to the treatment of crude sulphur for removing carbonaceous matter therefrom that tends to discolor the sulphur.

Crude sulphur occurs most commonly in regions where there is some petroleum or asphaltic matter of carbonaceous character, in the producing stratum. This so-called "oil" tends to discolor the sulphur causing it to appear brownish in color to a degree depending somewhat upon the carbonaceous content of the sulphur and somewhat upon the exposure of the sulphur to heat in its process of mining. Sulphur mined by the Frasch process is subjected to the action of hot water of various degrees of temperature ranging between 240° F. and 330° F. The exposure of the sulphur to the treating agent for extended periods seems to have some effect upon the degree of color imparted to the sulphur.

Sulphur thus discolored is not as desirable commercially as is the clear yellow sulphur and it will increase the value of the product to remove the carbonaceous matter producing the discoloration.

It is an object of our invention to provide a process of treating sulphur thus discolored so as to free the same of a large proportion of the carbonaceous matter and thus to wholly, or in part, restore the clear bright yellow color to the sulphur.

It is desired to bring a pulverized substance such as charcoal into contact with the sulphur to absorb the "oil". By "charcoal" we intend to include wood charcoal, animal charcoal or boneblack, carbon black and the like, all of which form good absorbing agents.

In carrying out our invention we heat the sulphur to reduce it to its liquid state, and mix with the same a small amount of finely divided carbon black or ground bone black or wood charcoal; and in some cases pulverized iron sulphide may be substituted for the carbon black or charred bone or wood. The absorbing agents are finely pulverized and may be mixed with the liquid sulphur in varying proportions. In cases where the carbonaceous matter was present in the proportion of 0.065% the use of 0.5% of boneblack removed 0.030% leaving 0.035% of the carbonaceous material in the sulphur. When 6% of the boneblack was used, the proportion of carbonaceous material was reduced to 0.015%. A further increase in the proportion of boneblack did not produce proportional results, although the proportion of carbonaceous content was decreased to .010% when 10% of bone black was used.

When the boneblack was brought into intimate contact with the sulphur, the mass was filtered and the sulphur came off with its natural light yellow color or with an improved color; the stain of the oil being removed wholly or in part.

In another batch where the carbonaceous content was about 0.020% the use of 6% boneblack reduced the percentage of carbonaceous matter to 0.005%.

Where carbon black was substituted for boneblack in the treatment, the sample of sulphur contained .055% of carbonaceous matter, and 0.25% of carbon black reduced the amount of carbonaceous material to 0.015% and this reduction was not perceptibly increased by the addition of more carbon black.

When a sample of sulphur containing 0.055% carbonaceous matter was treated with 0.125% wood charcoal, 0.030% carbonaceous matter was removed, leaving 0.025% in the sulphur.

Tests with powdered iron sulphide also resulted in a reduction of the carbonaceous content, but not to the same extent as when carbon black or wood charcoal or bone black were used. The sample containing 0.065% of oil was reduced to 0.050% by the use of 6% of powdered iron sulphide and again to 0.040% by the use of 10% of the sulphide. The color of the sulphur was improved in each case. Of the materials employed carbon black is the most effective; then wood charcoal, then boneblack and finally iron sulphide. Good results may be produced by mixtures of boneblack and carbon black or wood charcoal with the molten sulphur.

The absorbing agents thus employed are easily procured and improve the color and appearance of the sulphur to a marked degree. The process is therefore of value in the production of sulphur and of great commercial importance.

What we claim as new is:

1. A process of treating sulphur containing carbonaceous impurities, comprising reducing the sulphur to a liquid state, intimately mixing therewith a small percentage of charcoal and powdered iron sulphide, and filtering the resulting mass.

2. A process of treating sulphur containing carbonaceous impurities comprising reducing the sulphur to a liquid state, mixing therewith a small percentage of carbon black, iron sulphide and boneblack, and then filtering the resulting mass.

In testimony whereof, we hereunto affix our signatures this 27th day of July, A. D. 1928.

LYMAN S. BUSHNELL.
RITA MORALES.